United States Patent Office.

ANDREAS EIGNER, OF AUGSBURG, BAVARIA, ASSIGNOR TO SAMPSON R. URBINO, OF ROXBURY, MASSACHUSETTS.

IMPROVED VARNISH FOR PAINTINGS.

Specification forming part of Letters Patent No. 51,894, dated January 2, 1866.

*To all whom it may concern:*

Be it known that I, ANDREAS EIGNER, conservator of the Royal Gallery of Augsburg, in Bavaria, have invented a new and useful composition for preserving or protecting paintings or painted or colored surfaces from the destructive action of light, heat, moisture, or either; and I do hereby declare the said composition and the mode of compounding and using it to be fully described as follows—that is to say:

The said composition is made of the following-mentioned constituents or ingredients, in, or about in, their proportions, viz: one pound of purified bleached virgin wax; five pounds of purified and rectified oil of turpentine; one ounce of amber dissolved in an amount of linseed-oil sufficient to effect its dissolution; one-half an ounce of Venice turpentine; one-quarter of an ounce of balsam of copaiba. The above-mentioned solid and liquid matters are to be mixed or combined together, heat being employed, if necessary, to effect the more rapid intermixing or intercombining of them, and when made the composition is to be used by spreading it, by a brush or otherwise, on the surface to be protected.

Pictures or paintings prepared or covered with the composition will retain their original colors or brilliancy for many years or a great period of time, and the coating will be free from cracks. Probably no composition ever known has proved more efficacious for the purpose.

In regard to the functions of the ingredients, it may be said that the wax is the chief agent for resisting the action of moisture or the influence of the atmosphere upon the body of the colors. The remaining constituents operate to secure the transparency and durability of the wax. The turpentine renders the composition liquid. The amber operates to effect transparency to the body of the wax, and to insure to the composition the requisite hardness in drying or when drying. The Venetian turpentine enables the composition to resist the action of changes of temperature, and also renders it more capable of resisting the destructive action of moisture and the effects of mildew or mold. The balsam of copaiba serves as a vehicle of union of the other constituents, and is advantageous in other respects.

For conservation of old and new pictures, as well as for all kinds of oil-paintings in and outside of buildings, experience has proved that the rosin-varnishes which have heretofore been used for pictures could not effectually resist the injurious effects of atmospheric changes upon the body of colors as well as upon the body of varnish, and that the old antiquated rosin-varnishes were themselves the cause of the destruction of the pictures which they covered. Therefore the undersigned sought for a new composition consisting of other substances, which, with the requisite qualities of a good varnish, would insure the durable conservation of the pictures.

The qualities of this newly-discovered composition consist and verify themselves in the following manner: First, that the substances of which the composition is composed completely exclude all and every influence of the air upon the body of the colors, and thus operate to prevent drying up of the uniting-vehicle; also, that the body of the composition resists every influence of warmth and humidity, and therefore remains durable and unchangable, and retains its elasticity, whereby the cause of the cracking and scaling of the composition or the colors can seldom or never occur again; second, that the clearness of the colors gain by means of the colorlessness of and transparency of the substances of the composition, by which all the reflex influences which disturb the eye of the viewer are removed, through the peculiar soft, silky luster of the composition; third, in the easy partial or complete removal of the composition, uninjuriousness to the picture, and, in case of the partial damaging of the picture by external mechanical causes, such damages can be easily renovated, so as to be quite undiscoverable.

I claim as my invention—

The composition made of the ingredients and in the manner and for the purpose substantially as hereinbefore described.

ANDREAS EIGNER.

Witnesses:
  HEINRICH SCHLITTE,
  AUGUST PRAL.